April 26, 1949.　　　C. J. WILEY ET AL　　　2,468,387
AUXILIARY SPRING MOUNTING FOR VEHICLES
Filed March 25, 1947
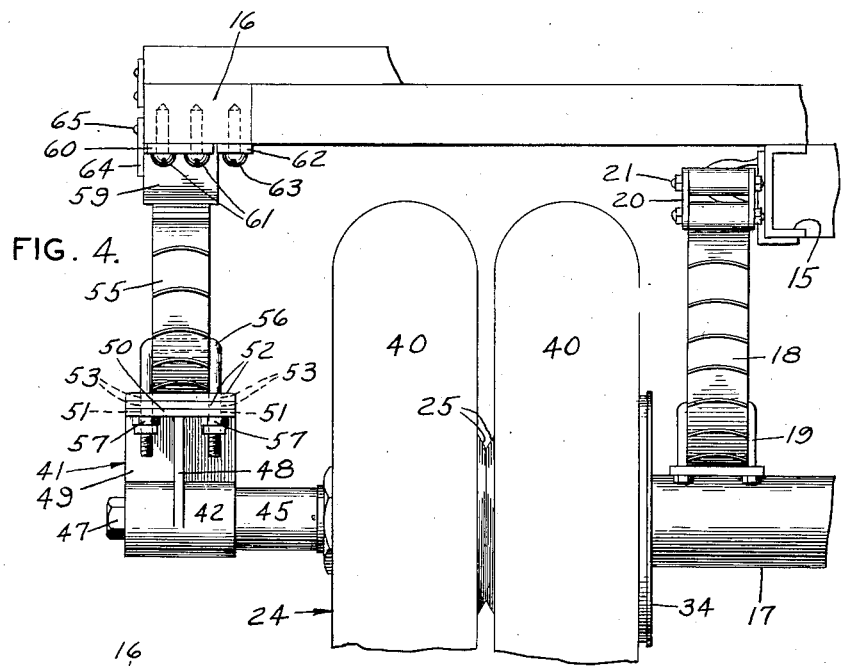
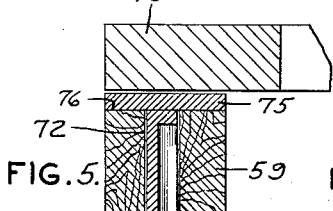
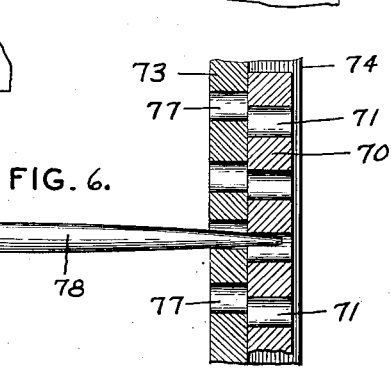
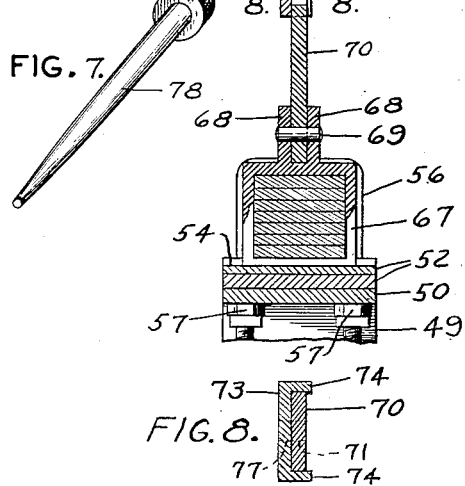
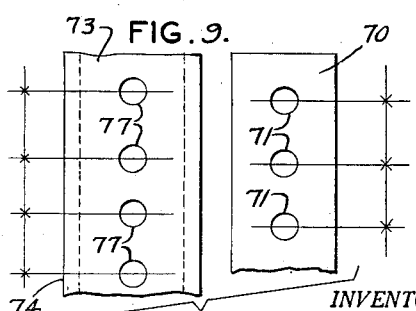
INVENTORS
P. H. BROOKS
B. H. CANADY
C. J. WILEY
BY
ATTORNEY Patented Apr. 26, 1949

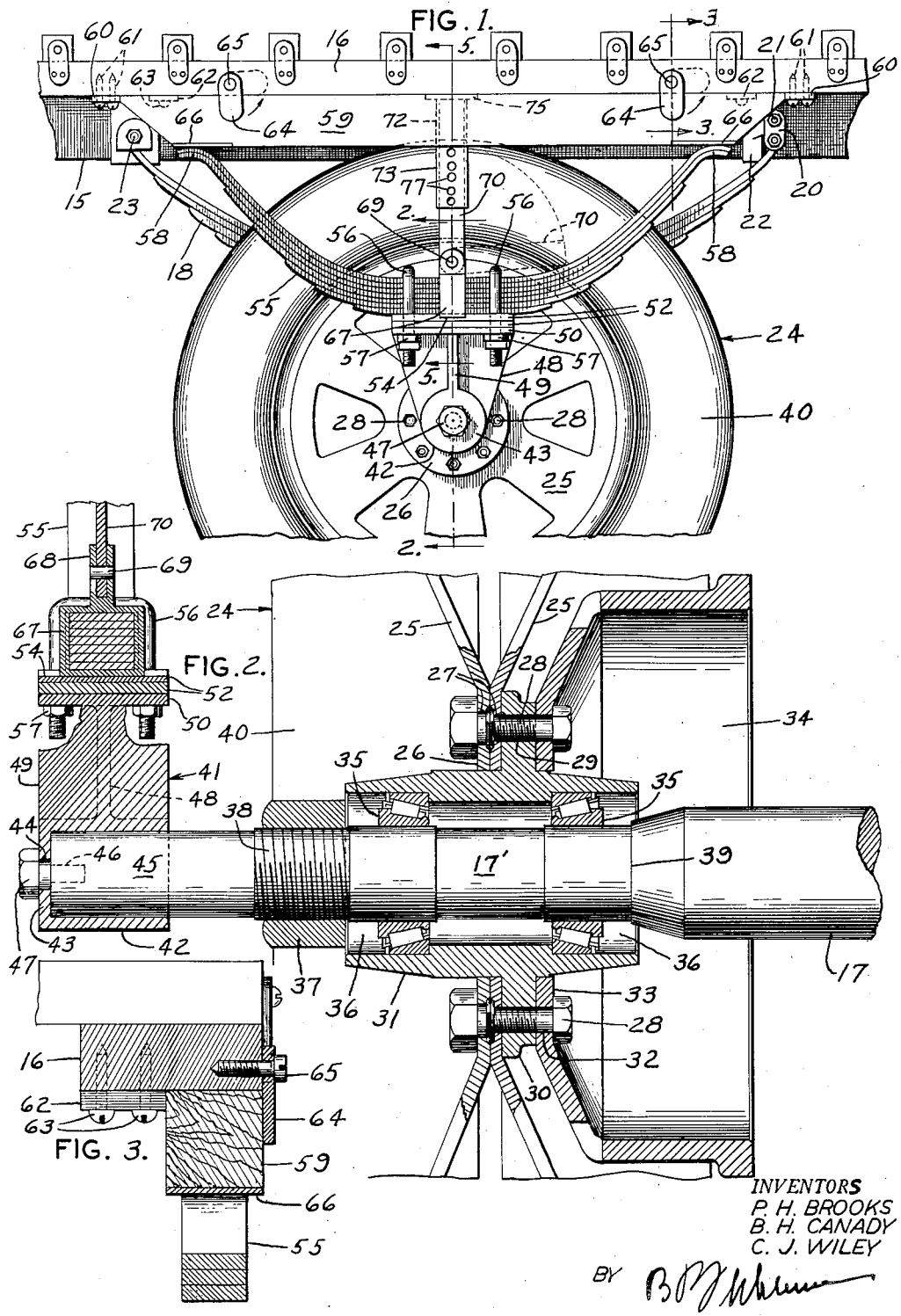

2,468,387

UNITED STATES PATENT OFFICE 2,468,387

AUXILIARY SPRING MOUNTING FOR VEHICLES

Clifford J. Wiley, Winslow, Ariz., Buel H. Canady, Huntington Park, Calif., and Patrick H. Brooks, Winslow, Ariz.

Application March 25, 1947, Serial No. 737,114

9 Claims. (Cl. 280—124)

Our invention relates to a spring mounting for vehicles such as truck trailers, and the like.

An important object of the invention is to provide an auxiliary spring mounting arranged on the outer sides of the wheels of a vehicle equipped with the usual spring mounting on the inner sides of the wheels.

A further object of the invention is to provide an auxiliary spring mounting similar to that shown and described in United States Patent No. 2,384,795, and provided with means to facilitate the removal of the auxiliary spring mounting, when it is necessary to change a tire, or the like.

A further object is to provide an auxiliary outside spring mounting to be mounted directly upon a non-rotatable axle of a vehicle, without requiring any frictionless bearing, such as a roller or ball bearing.

A further object is to provide spring mountings upon the inner and outer sides of the wheel units, thus reducing the liability of springing the axle, as the weight is properly balanced upon opposite sides of the wheel units.

A further object is to provide a device of the above mentioned character which will afford protection to vehicles having a relatively high center of gravity, by preventing them from turning over.

A still further object is to provide an auxiliary spring mounting of the character mentioned which is simple, compact, unitary, and relatively inexpensive to manufacture.

Other objects and advantages of the invention will be apparent during the course of the following description.

In the accompanying drawings, forming a part of this application, and in which like numerals are employed to designate like parts throughout the same, Figure 1 is a side elevation of the auxiliary spring mounting embodying our invention, and showing the same applied to the trailer of a truck, Figure 2 is a vertical transverse section taken on line 2—2 of Figure 1, parts broken away and parts omitted, Figure 3 is a fragmentary vertical section taken on line 3—3 of Figure 1, Figure 4 is a rear end elevation of the spring mounting and associated elements, Figure 5 is a vertical section taken on line 5—5 of Figure 1, and showing the auxiliary spring mounting in position for being removed bodily from the vehicle, Figure 6 is an enlarged fragmentary section, similar to Figure 5, showing a pin in position to enter registered openings, Figure 7 is a perspective view of a tapered pin, Figure 8 is a horizontal section taken on line 8—8 of Figure 5, and, Figure 9 is a fragmentary side elevation of a channel section and bar.

In the drawings, where for the purpose of illustration is shown a preferred embodiment of our invention, the numeral 15 designates a longitudinal channel beam, forming each side of the chassis or main frame of a truck trailer, or the like. Rigidly mounted upon the frame or chassis, and extending laterally outwardly beyond each channel beam 15, is the outer longitudinal beam or sill 16 of the truck trailer bed. Near the rear end of the chassis is the usual non-rotatable rear axle 17, serving to support the rear end of the trailer in conjunction with leaf springs 18. A leaf spring 18 is disposed near each outer end of the axle 17 and the central or intermediate portion of each leaf spring is rigidly clamped to the axle 17 by means including U-bolts 19. The rear end of each leaf spring 18 is pivotally connected with a shackle 20, and this shackle is pivoted at 21 upon a bracket 22, in turn rigidly secured to the adjacent channel beam 15. The forward end of each leaf spring 18 is secured to a fixed pivot or bolt 23, rigidly attached to the adjacent channel beam 15.

Arranged adjacent to each outer reduced end 17' of the axle 17, and disposed outwardly of the leaf springs 18 is a wheel unit 24, illustrated in the drawings as a dual wheel, and including disc wheels 25, having inner vertical annular portions 26. The inner annular portions 26 have openings 27 for receiving bolts 28. These bolts 28 also pass through openings 29 in the annular flange 30 of a roller bearing housing 31, and through openings 32 in the outer annular wall 33 of a brake drum 34. The bolts 28 rigidly clamp the wheels 25, bearing housing 31 and brake drum 34 together as an assembled unit. The bearing housing 31 contains roller bearings 35, directly rigidly mounted upon the adjacent reduced end 17' of the nonrotatable axle 17. These roller bearings 35 permit each wheel unit 24 to rotate freely upon the nonrotatable axle. Outer annular spaces 36 are provided within the bearing housing 31, and these spaces 36 receive suitable bearing seals, not shown. A retainer nut 37 engages over a screw threaded portion 38 of each reduced end 17' to retain the outer bearing seal within its space 36, while the inner seal is retained in place by a shoulder 39 formed upon the axle 17 adjacent to each reduced end 17'. The wheels 25 are equipped with tires 40. Each wheel unit 24 may consist of a single wheel or two or more wheels, as required. The foregoing description is that of a conventional truck trailer.

The outer auxiliary spring mounting includes a spring mounting member 41. This member 41 comprises a lower cylindrical portion or cap 42, having an outer end 43, provided with an opening 44. The cylindrical cap 42 is mounted upon a reduced cylindrical end extension 45 of the axle 17, extending axially outwardly beyond the screw threaded portion 38. The end extension 45 has a central axial screw threaded opening 46 in its outer end, to receive a screw 47 which extends through the opening 44 and securely clamps the member 41 upon the nonrotatable axle. The spring mounting member 41 further comprises vertical webs 48 and 49, arranged at right angles, and formed integral with the cap 42; and a top horizontal web or flange 50, integral with the webs 48 and 49. The vertical web 49 is disposed at the axis of the cap 42, see Figure 1. The horizontal flange 50 has two pairs of spaced openings 51, the pairs being equally spaced upon opposite sides of the axis of the cap 42. Mounted upon the horizontal flange 50 are one or more horizontal plates 52, having spaced pairs of openings 53 which register with the openings 51 of the flange 50. The top plate 52 has a rectangular recess or groove 54 at its longitudinal center, and directly above the axis of the cap 42. This groove 54 extends across the full width of the top plate 52, see Figure 2. Mounted upon the top plate 52 is an auxiliary spring 55, and this spring is rigidly secured to the top plate 52 by means of U-bolts 56, passing through the registered openings 53 and 51 in the plates 52 and flange 50 respectively. The U-bolts 56 carry nuts 57, which engage against the lower surface of the flange 50. It is thus seen that the spring mounting member 41 and auxiliary leaf spring 55 are securely assembled, as a unit, and are rigidly mounted upon the end extension 45 of the nonrotatable axle 17.

The auxiliary leaf spring 55 has upper curved ends 58, disposed beneath the trailer bed beam 16. Arranged between the upper curved ends 58 of the auxiliary spring, and the lower surface of the beam 16 is an auxiliary spring beam 59. This beam 59 is held in place against the beam 16, by the upward force exerted by the auxiliary spring 55. The beam 59 is held against longitudinal or end movement by blocks 60, arranged adjacent to its ends, and rigidly secured to the lower side of the beam 16, by screws 61, or the like. The beam 59 is held against inward lateral movement by blocks 62, adjacent to its inner side, and rigidly mounted upon the beam 16 by screws 63, or the like. Pivoted lugs or keepers 64 are provided near the ends of the beam 59 to prevent the outward lateral movement of the beam, and to permit the removal of the same when the auxiliary spring mounting is removed. The keepers 64 are pivotally connected to the beam 16 by means of pivot pins 65, or the like. When the auxiliary beam 59 is in position, its outer longitudinal vertical side is flush with the outer longitudinal side of the beam 16. The auxiliary spring beam 59 is provided with bearing plates 66, rigidly secured to the beam at its opposite ends, and these bearing plates frictionally engage the curved ends 58 of the auxiliary leaf spring 55. It should be emphasized that the auxiliary spring beam 59 is maintained in place by the upward force exerted by the auxiliary spring 55, in conjunction with the blocks 60 and 62 and the pivoted keepers 64. Obviously, each reduced end extension 45 of the nonrotatable axle 17 must be provided with the auxiliary spring mounting comprising the spring mounting member 41, auxiliary leaf spring 55, auxiliary spring beam 59 and associated elements.

Means are provided to facilitate the removal of each auxiliary spring mounting from the truck trailer when it becomes necessary to change a tire, or the like. Such means includes a sleeve or strap 67, disposed in the groove 54 of the top plate 52 and receiving the auxiliary leaf spring 55 therein. The sleeve 67 is disposed at the longitudinal center of the leaf spring 55. This sleeve 67 carries vertical knuckles 68, integral therewith, having aligned openings, to receive a pin 69 therein. Pivotally mounted upon the pin 69 and arranged between the knuckles 68 is a flat bar 70, which is rectangular in transverse cross section. This bar is disposed vertically above the transverse center of the auxiliary leaf spring 55. The bar 70 is adapted to extend upwardly from the sleeve 67, and its upper end terminates near the auxiliary spring beam 59. The bar is provided near its upper end with a plurality of equally longitudinally spaced openings 71. Arranged within a central vertical rectangular opening 72 in the auxiliary spring beam 59 is a section of channel iron 73, depending from the beam 59 and slidably receiving the bar 70 within the open space between its side webs 74. The channel section 73 has securely welded to its upper end a horizontal rectangular plate 75, disposed within a rectangular recess 76, formed in the top of the beam 59. The top of the plate 75 is flush with or slightly below the top surface of the beam 59. The channel section 73 is thus suspended from the auxiliary spring beam 59, and cannot become separated therefrom while the beam is mounted upon the trailer. Near the lower end of the channel section 73, the same is provided with a plurality of unequally longitudinally spaced openings 77. These openings 77 are disposed substantially opposite to the group of openings 71 in the bar 70, and are adapted to register with such openings. The openings 71 and 70 are of the same diameter. The bar 70 is adapted to move vertically relative to the channel section 73, and because of the spacing of the openings 71 and 77, the maximum probability of partial registration of some of the openings 71 and 77 is obtained.

A tapered pin 78 is provided, and when it is desired to remove the auxiliary spring and associated elements, such as when changing a tire, the tapered end of the pin 78 is inserted within an opening 77 in the channel section 73, just above and in partial registration with an opening 71 of the bar 70, see Figure 6. The tapered pin 78 is now driven entirely into the two partially registered openings 77 and 71, to draw them into complete registration, see Figure 5. When this occurs, the channel section 73 is pulled downwardly slightly, and due to the plate 75, the auxiliary spring beam 59 is also pulled downwardly and away from frictional engagement with the bottom of the beam 16, see Figure 5. The beam 59 is now securely locked to the auxiliary spring 55 and maintained in the lowered or retracted position by the pin 78 and associated elements. The same result can be obtained by first inserting the pin 78 within a pair of the openings 77 and 71 which are in complete registration, and then removing some weight, such as a heavy crate or the like from the trailer bed. This will cause the auxiliary spring beam 59 to separate from the beam 16. Either way, when the beam 59 moves downwardly and away from the beam 16, it is merely necessary to swing the pivoted keepers 64 to the upper position, shown dotted in Figure 1, and remove the screw 47 which secures the spring mounting member 41 to the axle 17. When this has been done, the auxiliary spring mounting including the spring 55, spring mounting member 41 auxiliary spring beam and associated elements may be removed bodily as a unit from the trailer. The means including the channel section 73 and bar 70 are designed to constitute a permanent part of each auxiliary spring mounting and cannot interfere with the normal operation of the auxiliary spring. The auxiliary spring mounting at each end of the axle 17 of course includes the means to facilitate the removal of the spring mounting.

The entire device is simple, compact and practical; it constitutes a relatively inexpensive improvement for conventional truck trailers, and the like.

It is to be understood that the form of our invention herewith shown and described is to be taken as a preferred embodiment of the same, and various changes in the shape, size, and arrangement of parts may be resorted to without departing from the spirit of our invention, or the scope of the subjoined claims.

Having thus described our invention, what we claim is:

1. In a vehicle, a chassis, a nonrotatable axle disposed beneath the chassis for supporting the same, a wheel rotatably mounted upon the axle near one end thereof, said axle having an end extension projecting outwardly beyond the wheel, an inner leaf spring mounted upon the nonrotatable axle and secured to the chassis, an auxiliary spring mounting member mounted upon the end extension, an auxiliary leaf spring rigidly secured to the auxiliary spring mounting member and including upper curved ends, an auxiliary beam disposed above the auxiliary leaf spring and adapted to engage the curved ends of the same to support the chassis, and adjustable means associated with the auxiliary beam and secured to the axle for retracting the auxiliary beam to facilitate the removal of the beam, auxiliary spring, and auxiliary spring mounting member from the vehicle.

2. An auxiliary spring mounting for a vehicle provided with an axle having an end extension disposed outwardly of the wheel, comprising an auxiliary spring mounting member mounted upon the end extension, an auxiliary leaf spring mounted upon the auxiliary spring mounting member and having upper ends, an auxiliary beam supported by the upper ends of the auxiliary leaf spring, the auxiliary beam being adapted to support the chassis of the vehicle, a substantially vertical bar connected with the auxiliary beam, a second substantially vertical bar secured to the intermediate portion of the leaf spring, said bars having a sliding guiding engagement, and means to lock the bars together against relative longitudinal movement.

3. An auxiliary spring mounting for a vehicle having a chassis, an axle, a wheel mounted upon one end of the axle and an inner spring, comprising an auxiliary spring mounting member, means to mount the auxiliary spring mounting member upon the axle, an auxiliary leaf spring mounted upon the auxiliary spring mounting member and including upper ends, an auxiliary beam arranged to be supported by the upper ends of the auxiliary leaf spring, said auxiliary beam serving to support the chassis, a substantially vertical bar connected with the auxiliary beam, a second substantially vertical bar connected with the auxiliary spring mounting member, said substantially vertical bars being arranged near each other and having relative longitudinal movement during the operation of the auxiliary spring mounting, and releasable means for connecting the bars so that they are held against relative longitudinal movement.

4. An auxiliary spring mounting for a vehicle having a chassis, an axle, a wheel mounted upon one end of the axle and an inner spring, comprising an auxiliary leaf spring, means for detachably mounting the auxiliary leaf spring upon the axle outwardly of the wheel, an auxiliary beam arranged to be supported by the auxiliary leaf spring, said auxiliary beam serving to support the chassis, a substantially vertical bar connected with the auxiliary beam and having an opening formed therein, a second substantially vertical bar connected with the mounting means and having an opening therein, said substantially vertical bars being arranged near each other and having relative longitudinal movement during the operation of the auxiliary spring mounting, the openings in the bars being adapted to be out of registration, and a tapered pin for insertion within the openings.

5. An auxiliary spring mounting for a vehicle having a chassis, an axle, a wheel mounted upon one end of the axle and an inner spring, comprising an auxiliary leaf spring to be arranged outwardly of the wheel, means for detachably mounting the auxiliary leaf spring from the axle, an auxiliary beam arranged to be supported by the auxiliary leaf spring and serving to support the chassis, releasable means for holding the auxiliary beam in place, a substantially vertical channel bar secured to the auxiliary beam and having longitudinally spaced openings, a second substantially vertical bar secured to the mounting means and held within the channel bar and having longitudinally spaced openings, the channel bar and second bar having relative longitudinal movement during the operation of the auxiliary spring mounting, and a pin for insertion within selected openings of the channel bar and the second bar, the arrangement being such that the auxiliary spring, auxiliary beam, and bars are removable as a unit from the axle.

6. In a vehicle, a chassis, a nonrotatable axle disposed beneath the chassis to support the same, a wheel rotatably mounted upon the axle near one end thereof, said axle having an end extension projecting outwardly beyond each wheel, an inner leaf spring mounted upon the nonrotatable axle adjacent to the inner side of each wheel and secured to the chassis for supporting the same, an auxiliary spring mounting member securely mounted upon each end extension and including a horizontal flange, an auxiliary leaf spring rigidly mounted upon the horizontal flange and including upper longitudinally curved ends, an auxiliary beam disposed longitudinally above the auxiliary leaf spring and held against longitudinal and lateral movement and adapted to engage upon the curved ends and to help support the chassis and having a central vertical opening therein, a bar disposed within the central opening and rigidly secured against downward movement relative to the auxiliary beam and depending from such beam and having vertically spaced openings in its depending portion, a second bar adjacent to the first named bar and rigidly connected to the auxiliary spring mounting member and having vertically spaced openings to register with the openings in the first named bar and free to move vertically relative to the first named bar, and a pin to be inserted within a selected pair of openings in the bars.

7. In a vehicle, a chassis, an axle arranged beneath the chassis, a wheel mounted upon the axle near one end thereof, the axle having an extension projecting axially outwardly beyond the wheel, an inner leaf spring mounted upon the axle upon the inner side of the wheel and secured to the chassis, an outer leaf spring disposed upon the outer side of the wheel, releasable means for mounting the outer leaf spring upon the axle extension so that the other leaf spring may be separated from the axle extension by shifting the outer leaf spring axially of the axle extension, an auxiliary beam separate from the chassis and enaging therewith and separated from the chassis by a movement axially of the axle extension, the auxiliary beam exerting a downward pressure upon the ends of the outer leaf spring, and adjustable means to connect the intermediate portion of the outer leaf spring and the intermediate portion of the auxiliary beam and serving to draw the same together and to hold the same in the adjusted position, the arrangement being such that the auxiliary beam may be separated from the chassis by a movement axially of the axle extension when the auxiliary beam and outer leaf spring are drawn together.

8. In a vehicle, a chassis, an axle arranged beneath the chassis, a wheel mounted upon the axle near one end thereof, the axle having an extension projecting axially outwardly beyond the wheel, an inner leaf spring mounted upon the axle upon the inner side of the wheel and secured to the chassis, an outer leaf spring disposed upon the outer side of the wheel, releasable means for mounting the outer leaf spring upon the axle extension so that the outer leaf spring may be separated from the axle extension by shifting the outer leaf spring axially of the axle extension, an auxiliary beam separate from the chassis and arranged beneath a portion of the same to engage therewith and separated from the chassis by a movement axially of the axle extension, the auxiliary beam exerting a downward pressure upon the ends of the outer leaf spring, and means to connect the intermediate portion of the outer leaf spring and the intermediate portion of the auxiliary beam for preventing the same from spreading.

9. In a vehicle, a chassis, an axle arranged beneath the chassis, a wheel mounted upon the axle near one end thereof, the axle having an extension projecting axially outwardly beyond the wheel, an inner leaf spring mounted upon the axle upon the inner side of the wheel and secured to the chassis, an outer leaf spring disposed upon the outer side of the wheel, releasable means for mounting the outer leaf spring upon the axle extension so that the outer leaf spring may be separated from the axle extension by shifting the outer leaf spring axially of the axle extension, a generally horizontal generally straight auxiliary beam separate from the chassis and arranged beneath a portion of the chassis to engage therewith and separated from the chassis by a outward movement axially of the axle extension, the auxiliary beam exerting a downward pressure upon the ends of the outer leaf spring, releasable means secured to the chassis for holding the auxiliary beam against axial movement with relation to the axle extension, and means to connect the intermediate portion of the outer leaf spring and the intermediate portion of the auxiliary beam for preventing the same from spreading.

CLIFFORD J. WILEY.
BUEL H. CANADY.
PATRICK H. BROOKS.

REFERENCES CITED

The following references are of record in the file of this patent:

UNITED STATES PATENTS

| Number | Name | Date |
|---|---|---|
| 1,972,564 | Jacob | Sept. 4, 1934 |
| 2,096,636 | Green | Oct. 19, 1937 |